US009128180B2

(12) United States Patent
Saha et al.

(10) Patent No.: US 9,128,180 B2
(45) Date of Patent: Sep. 8, 2015

(54) EFFICIENT POWER USAGE IN POSITION TRACKING OPERATIONS

(75) Inventors: Sanjib Saha, Sammamish, WA (US); Gang Zhao, Redmond, WA (US); Ashish Gadre, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 572 days.

(21) Appl. No.: 13/423,109

(22) Filed: Mar. 16, 2012

(65) Prior Publication Data

US 2013/0244686 A1 Sep. 19, 2013

(51) Int. Cl.
*H04W 24/00* (2009.01)
*G01S 19/34* (2010.01)
(Continued)

(52) U.S. Cl.
CPC .............. *G01S 19/34* (2013.01); *G06F 1/3206* (2013.01); *G06F 1/3293* (2013.01); *H04W 52/0254* (2013.01); *H04W 52/0293* (2013.01); *Y02B 60/121* (2013.01); *Y02B 60/50* (2013.01)

(58) Field of Classification Search
CPC .................... H04W 52/0251; H04W 52/0283; H04W 52/0293; H04W 52/0261; H04W 52/0274; H04W 52/028; H04W 4/02; H04W 64/00; H04W 4/021; H04W 4/027; H04W 4/028; H04W 4/16; H04W 40/20; H04W 48/04; H04W 4/025; H04W 4/04; G01S 19/34; G01S 19/48; G01S 19/00; G01S 5/0009; G01S 5/02; G01S 5/0263; G01S 5/10; Y02B 60/121; Y02B 60/50; Y02B 60/32; Y02B 60/144; Y02B 60/1292; Y02B 60/142; G06F 1/3293; G06F 1/3203; G06F 1/32; G06F 1/3206; G06F 1/3243; G06F 9/5094; G06F 1/3234; G06F 1/329; G06F 1/3287

USPC .......... 455/574, 41.2, 456.3, 404.2, 418, 419, 455/422.1, 452.1, 456.1, 466, 550.1, 556.1, 455/556, 457, 414.1, 404.1, 412.2; 357/357.74; 713/320; 340/989, 426.19, 340/39.13; 342/357.2, 357.28, 450
See application file for complete search history.

(56) References Cited

U.S. PATENT DOCUMENTS 7,071,871 B2 7/2006 Horslund et al.
2005/0083230 A1* 4/2005 Harvey et al. ............ 342/357.06
(Continued)

FOREIGN PATENT DOCUMENTS

CN 1917401 A 2/2007
CN 102246545 A 11/2011

OTHER PUBLICATIONS

Kjiergaard, et al., "EnTracked: Energy-Efficient Robust Position Tracking for Mobile Devices," In Proceedings of the 7th International Conference on Mobile Systems, Applications, and Services, Jun. 22-25, 2009, pp. 221-234.
(Continued)

*Primary Examiner* — Fred Casca
(74) *Attorney, Agent, or Firm* — Sunah Lee; Kate Drakos; Micky Minhas

(57) ABSTRACT

Techniques and tools for reducing power consumption of computing devices (e.g., mobile devices such as mobile phones and tablet computers) that perform position tracking operations are described. In described examples, a low-power processor calculates (e.g., in real time) position information (e.g., GPS position fixes) based on information received from a positioning system (e.g., GPS) and stores the position information for later use in a buffer associated with the low-power processor (e.g., in storage on the low-power processor). Described examples allow position information to be calculated in real time and stored while the device is in a low-power state, and can be used with location-based applications that do not require position information to be delivered to the application in real time.

11 Claims, 10 Drawing Sheets

(51) Int. Cl.
*H04W 52/02* (2009.01)
*G06F 1/32* (2006.01)

(56) References Cited

U.S. PATENT DOCUMENTS

2009/0054075 A1 2/2009 Boejer et al.
2009/0243929 A1 10/2009 Sengupta et al.
2010/0039316 A1 2/2010 Gronemeyer et al.
2010/0151882 A1* 6/2010 Gillies et al. ............... 455/456.1
2010/0162021 A1 6/2010 Kennard et al.
2010/0324819 A1 12/2010 Nurminen et al.
2011/0102257 A1 5/2011 Spyropoulos et al.

OTHER PUBLICATIONS

"First Office Action Issued in Chinese Patent Application No. 201310084569.6", Mailed Date: Apr. 3, 2015, 11 Pages.

* cited by examiner

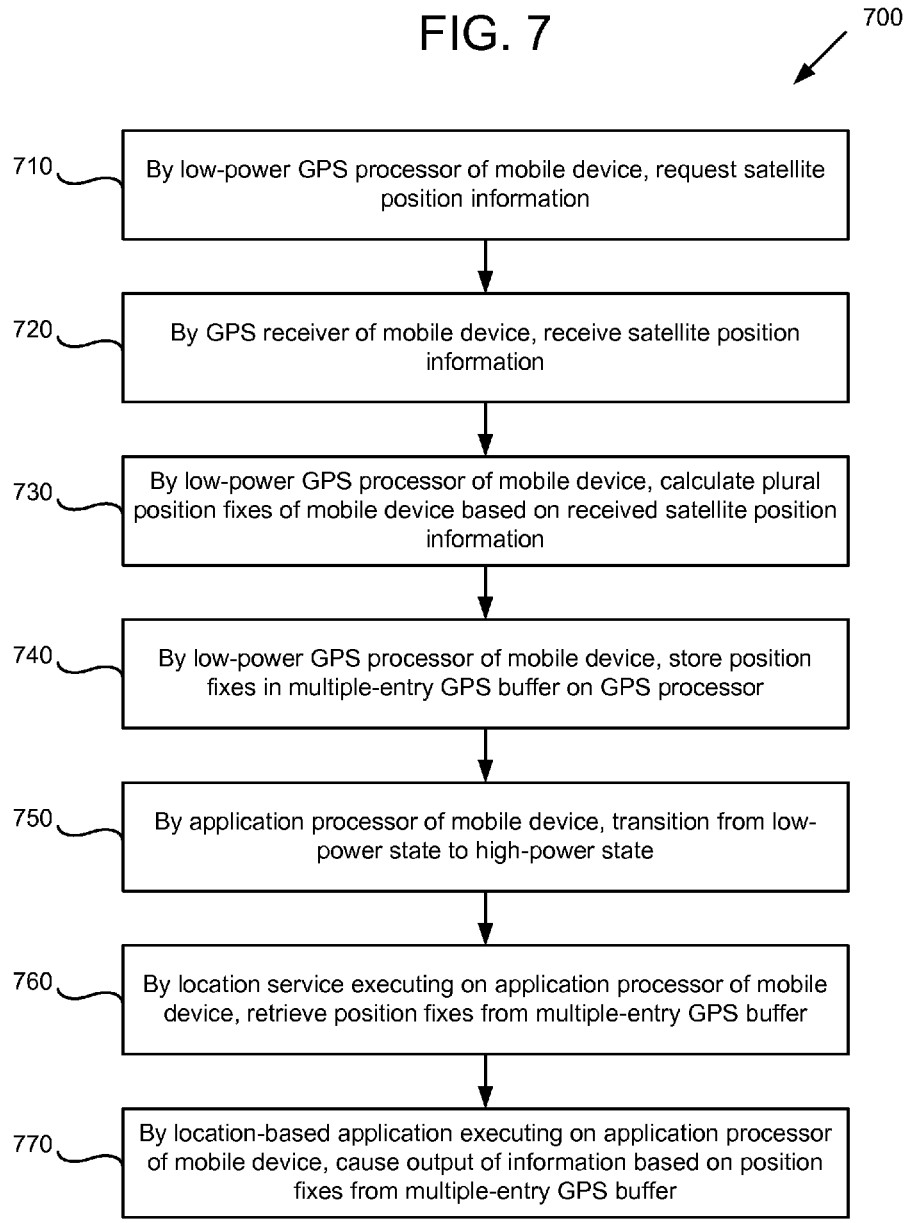

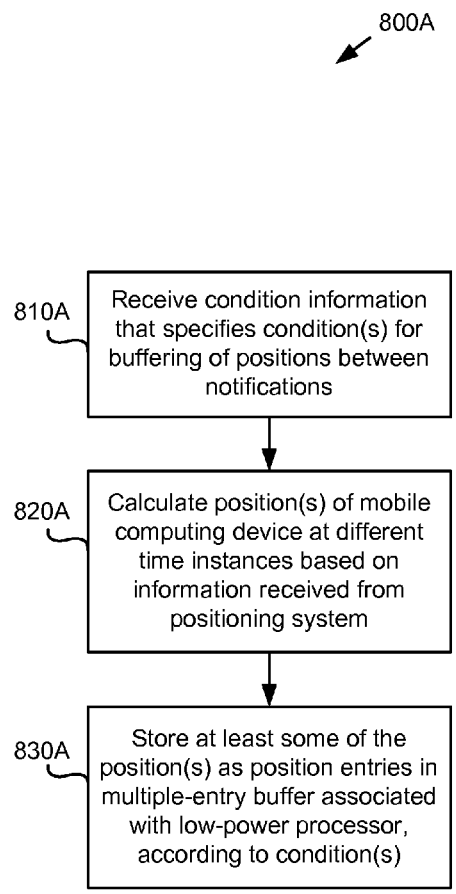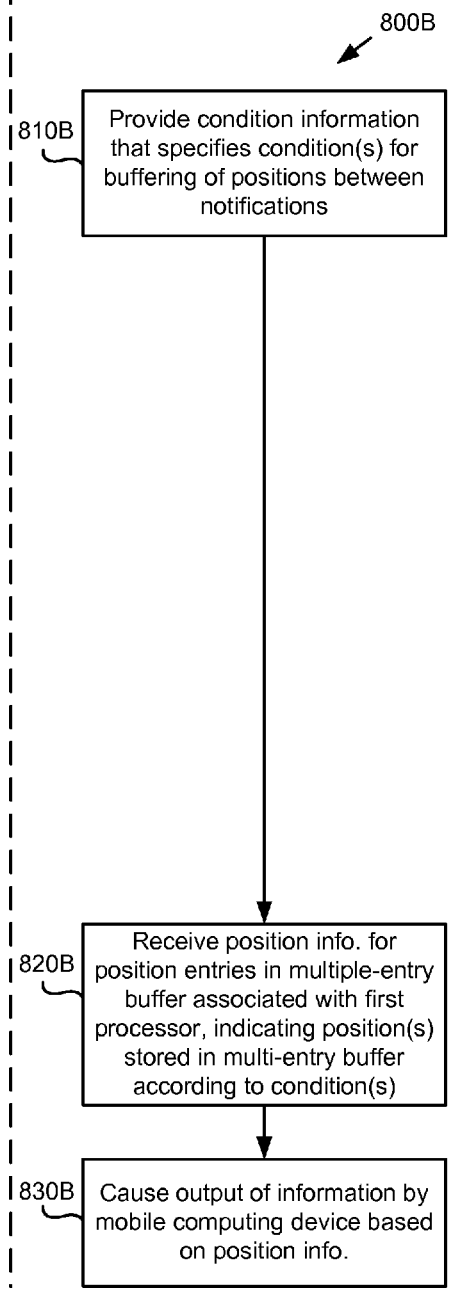

Software 980 implementing described technology

US 9,128,180 B2

EFFICIENT POWER USAGE IN POSITION TRACKING OPERATIONS

BACKGROUND

Computer-aided map navigation tools have achieved widespread acceptance. A user can find an address or directions with map navigation tools available at various Web sites. In cars, GPS devices have provided rudimentary road navigation for years. More recently, map navigation software for cellular telephones and other mobile computing devices have been developed. Although GPS functionality is also available for mobile computing devices, GPS functionality can be a significant power drain with adverse effects on battery life.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools for reducing power consumption of computing devices (e.g., mobile devices such as mobile phones and tablet computers) that perform position tracking operations are described. In described examples, a low-power processor calculates (e.g., in real time) position information (e.g., GPS position fixes) based on information received from a positioning system (e.g., GPS) and stores the position information for later use in a buffer associated with the low-power processor (e.g., in storage on the low-power processor). Described examples allow position information to be calculated in real time and stored while the device is in a low-power state. Described examples are useful for reducing power consumption by devices with location-based applications that do not require position information to be delivered to the application in real time.

In one aspect, a low-power processor of a mobile computing device receives condition information (e.g., from an application processor on which a location-based application and/or location service are executing) that specifies one or more conditions for buffering of positions between notifications. For example, the condition(s) include a threshold for movement between positions to be buffered and a threshold for distance between positions that will trigger a notification. The low-power processor calculates positions of the mobile computing device at different time instances based on information received from a positioning system (e.g., GPS). According to the condition(s), the low-power processor stores at least some of the positions as position entries in a multiple-entry buffer associated with the low-power processor.

Subsequently, the low-power processor can provide position information for the position entries from the multiple-entry buffer (e.g., to the application processor). For example, the low-power processor provides the position information along with, or as part of, a notification after determining that the multiple-entry buffer has reached a buffer fullness level. Or, the low-power processor provides the position information responsive to a request for position information (e.g., from a location service executing on the application processor when the application processor is in a high-power state). Such a request can be sent periodically or on demand. Or, the low-power processor provides the position information along with, or as part of, a notification after determining that distance between two of the positions stored as position entries exceeds a distance threshold.

In another aspect, an application processor of a mobile computing device provides (e.g., to a low-power processor that implements a position tracking engine) condition information that specifies one or more conditions for buffering of positions between notifications. Positions can then be stored in a multiple-entry buffer of the low-power processor according to the condition(s). Subsequently, the application processor receives position information for position entries in the multiple-entry buffer. The application processor causes output of information (e.g., via a graphical user interface rendered on a display) based on the position information.

After providing the condition information, the application processor can transition from a high-power state to a low-power state, during which positions are still buffered according to the condition(s). The application processor transitions from the low-power state back to the high-power state to receive position information. The application processor can transition back to the high-power state in order to request (periodically or on an on-demand basis) position information from the low-power processor. Or, the application processor can transition back to the high-power state in response to a notification (e.g., from the low-power processor) to awaken from the low-power state.

In another aspect, a low-power GPS processor of a mobile computing device requests satellite position information, and a GPS receiver of the device receives satellite position information. The low-power GPS processor calculates positions of the device based on the received satellite position information and stores the positions in a multiple-entry GPS buffer on the GPS processor. An application processor of the device transitions from a low-power state to a high-power state, and a location service executing on the application processor retrieves the positions from the buffer. A location-based application executing on the application processor causes output of information (e.g., via a graphical user interface rendered on a display) based on the positions.

In another aspect, a mobile computing device comprises an application processor operable to switch between one or more low-power states and one or more high-power states, a first storage medium and a low-power processor. The first storage medium with computer-executable code corresponding to a first interface between a location-based application executable by the application processor and a location service. The first interface supports specification by the location-based application of one or more conditions under which position information is buffered between notifications. The low-power processor provides a second interface, which supports specification by the location service of one or more conditions under which a position tracking engine buffers position information between notifications. The position tracking engine is adapted to control buffering in position entries of a second storage medium, according to the condition(s) specified by the location service, of positions of the mobile computing device at difference time instances. The position entries are accessible by the location-based application and/or location service.

The foregoing and other objects, features, and advantages of the invention will become more apparent from the following detailed description, which proceeds with reference to the accompanying figures.

BRIEF DESCRIPTION OF THE DRAWINGS

FIG. 7 is a flowchart showing an exemplary technique for operations of a low-power GPS processor and an application processor for efficient power usage in a device running an application that uses position information.

FIGS. 8A and 8B are flowcharts showing exemplary techniques 800A, 800B for operations performed by a first processor (e.g., a GPS processor) and a second processor (e.g., an application processor), respectively, on a smart phone or other mobile device.

DETAILED DESCRIPTION

Figure 1:
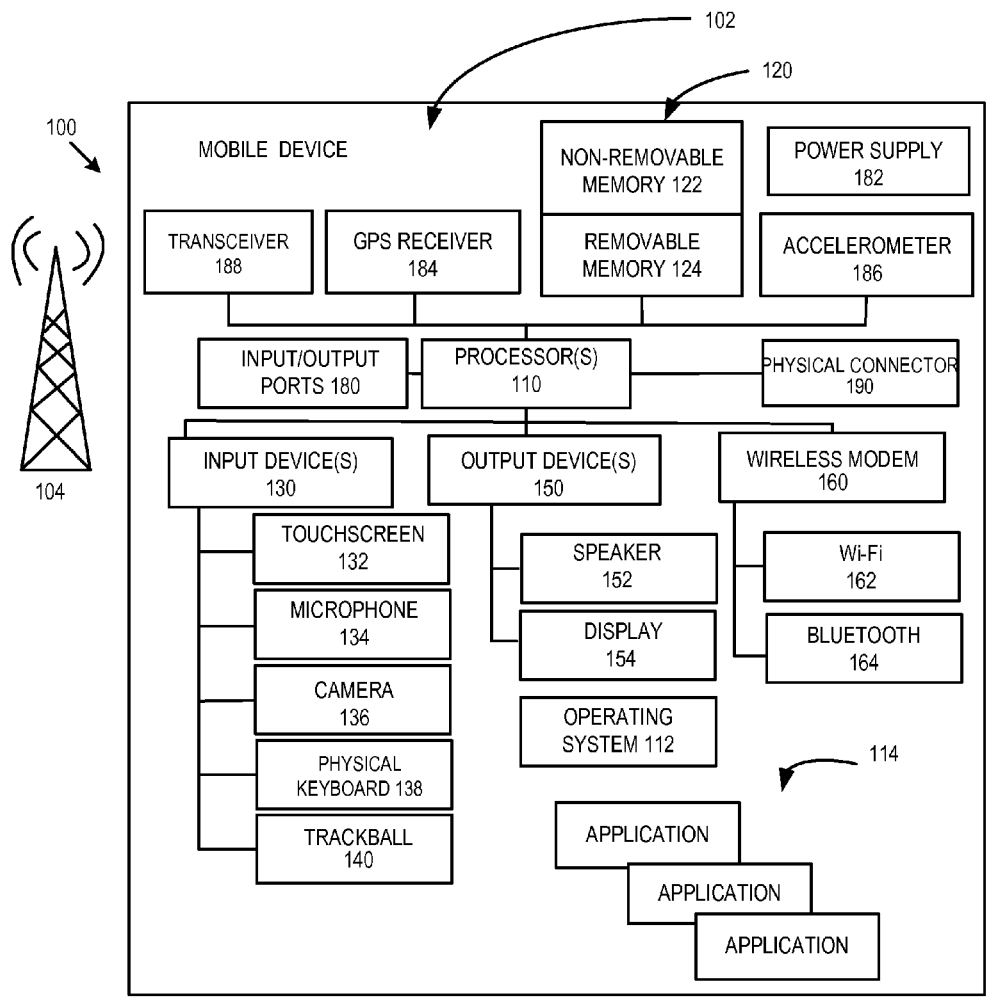
FIG. 1 is a block diagram illustrating an example mobile computing device in which at least some technologies described herein may be implemented.

A computing device with position tracking functionality (e.g., GPS functionality) can calculate position information (e.g., GPS position fixes) in order to track the location of the device. Such functionality is especially useful today for mobile computing devices and platforms that offer location-based applications and services.

Many approaches to position tracking can result in high power consumption. For example, if a location engine running on a device keeps the device in a high-power mode by requesting and maintaining position information in real time (e.g., by polling GPS hardware at a regular frequency, or by having GPS hardware respond when the device has moved a threshold distance), the high-power mode leads to high power consumption. Similarly, any application that uses a location engine that tracks the position of a device can be battery-intensive, especially if the application is causing a device on which it is running to process position information in real time and operate in a high-power mode (e.g., where the entire processor stack of the device is active) whenever position information is being calculated. Polling models can be adjusted to change polling intervals depending on movement patterns (e.g., increasing or decreasing polling frequency based on how fast a device is moving or where it is located) and other adjustments also can be made (e.g., reducing scheduling priority of applications that use position information). However, even if some behavior with regard to collection of position information is modified, applications, operating systems and services that keep devices in a high-power mode can lead to inefficient power usage in some scenarios.

Power usage in computing devices with position tracking can be made more efficient. Accordingly, exemplary techniques and tools for reducing power consumption of computing devices (e.g., mobile devices such as mobile phones and tablet computers) that use position tracking are described. In described examples, position tracking operations are offloaded to a low-power processor that captures position information (e.g., in real time), stores the position information in a buffer associated with the low-power processor (e.g., in storage on the low-power processor), and transfers position information to an application processor as needed (e.g., when the buffer has reached a predetermined fullness level and is flushed to prevent data loss, or when an application requests position information). Described examples can help to avoid updating position information immediately to the application processor when it is not necessary, which can reduce the time an application processor spends in a high-power mode, thus helping to reduce the overall power draw of the device and preserve battery life. Described examples are useful, for example, when running applications that do not require real-time delivery of position information in order to function.

As used herein, the term "positioning system" can refer to any number of positioning systems from which the location of a computing device can be calculated, including satellite-based positioning systems such as Global Positioning System (GPS), BeiDou/COMPASS, GLONASS, and Galileo. Examples described herein that refer to GPS can be adapted for other positioning systems. As used herein, the term "position fix" refers to a calculated position of a computing device (e.g., a position comprising a latitude and a longitude, and potentially other information such as altitude) that is made with reference to two or more other objects, such as satellites. For example, a GPS position fix is calculated based on information received from two or more GPS satellites. The exact operations used to calculate position fixes and the data structures used to represent position fixes can vary based on implementation and the particular positioning system being used. As used herein, the term "multiple-entry" is used to refer to a buffer, data structure, or operation that is capable of handling multiple entries (e.g., position fixes or other position information) at one time, but does not require that more than one entry always be handled. For example, a multiple-entry buffer can store multiple position information entries, and a single buffer flushing operation can move multiple position information entries from the multiple-entry buffer (e.g., in response to a request from an application or location service). On the other hand, a multiple-entry buffer also can be flushed at times when only one entry or no entries are present in the buffer.

In general, processors described herein are processing units that can be implemented in the same chip (e.g., system-on-a-chip (SoC) designs, multi-core designs) or on different chips in a computing device. As used herein, the term "application processor" refers to a processing unit of a device that typically runs when the device is in a high-power or active state, but the application processor may also have a low-power or idle state. An application processor typically handles operations such as operating system functionality and application functionality (e.g., interpreting user input from a keypad or touchscreen to produce changes in the state of an application running on a device) and has a high power draw compared to low-power processors.

As used herein, the term "low-power processor" refers to a processing unit of a device which can run when the device is in a high-power state or a low-power state, and has a lower power draw than the application processor. A low-power processor has a lower power draw than the application processor because, for example, it does not execute the operating system or diverse types of applications. For example, the low-power processor may be an application-specific integrated circuit (ASIC) or other special-purpose hardware with limited functionality, which typically reduces power consumption by the processor. A low-power processor also may have a lower power draw because it does not require other processors to be active, as application processors often do. Low-power processors can be used to handle particular operations of a device. For example, a low-power processor can perform position tracking operations implemented with firmware, other software adapted to the low-power processor and/or special-purpose hardware; such a processor can be referred to as a "position tracking processor" or a "GPS processor." However, a position tracking processor need not be limited to handling position tracking operations, and may handle other operations besides position tracking operations. Furthermore, other processors may handle position tracking operations. For example, a low-power processor that performs modem operations can be referred to as a "modem processor," but a modem processor can be used to handle other operations as well, such as position tracking operations.

As used herein, the term "provides . . . information" does not imply any timing requirement or role of a processor in initiating the "providing" operation. A first processor can provide information to a second processor by (a) directly sending the information to the second processor as part of a message or as parameters to a function call, (b) sending a notification to the second processor that the information can be retrieved from a buffer or that the information will follow in another message, (c) writing the information in a buffer for the second processor to retrieve, and/or (d) using some other mechanism to make the information available to the second processor. For example, using any of these mechanisms, an application processor can provide condition information indicating quality of service settings to a low-power processor. In some implementations described herein, the application processor passes condition information as parameters of a function call across an interface exposed by the low-power processor, but alternatively the application processor provides the condition information in some other way. As another example, using any of these mechanisms, a low-power processor can provide position information indicating position fixes to an application processor. In some implementations described herein, the low-power processor sends a notification (using a callback function registered through the interface exposed by the low-power processor) that position information is available in a buffer for the application processor to retrieve, but alternatively the low-power processor provides the position information in some other way. Similarly, the term "receives . . . information" does not imply any timing requirement or role of a processor in initiating the "receiving" operation. Rather, the "receiving" operation uses any suitable mechanism that complements the "providing" operation.

The examples described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require any specific advantages to be present or problems to be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures do not show all the ways in which the disclosed things and methods can be used in conjunction with each other or with other things and methods. Additionally, the description sometimes uses terms like "request," "retrieve," and "determine" to describe disclosed methods. These terms are high-level abstractions of the actual operations that are performed. The actual operations that correspond to these terms can vary depending on the particular implementation and are readily discernible by one of ordinary skill in the art.

In general, the disclosed methods can be implemented as computer-executable instructions stored on one or more computer-readable storage media (e.g., non-transitory computer-readable media, such as one or more volatile memory components (such as DRAM or SRAM), or non-volatile memory components (such as hard drives, programmable logic arrays (PLAs) or ROMs)) and executed on a computer (e.g., any commercially available computer, including smart phones or other mobile devices that include computing hardware). Computer-executable instructions for implementing the disclosed techniques as well as data created and used during implementation of the disclosed embodiments can be stored on one or more computer-readable media (e.g., non-transitory computer-readable media). For a low-power processor, for example, the computer-executable instructions can be part of firmware in a PLA, ROM, flash memory, etc. and/or other software adapted to the low-power processor. For the location-based application, for example, the computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. The disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

I. Exemplary Mobile Devices

FIG. 1 is a system diagram depicting an exemplary mobile device 100 including a variety of optional hardware and software components, shown generally at 102. In general, a component 102 in the mobile device can communicate with any other component, although not all connections are shown, for ease of illustration. The mobile device 100 can be any of a variety of computing devices (e.g., cell phone, smart phone, handheld computer, tablet computer, etc.) and can allow wireless two-way communications with one or more mobile communications networks 104, such as a cellular or satellite network.

The illustrated mobile device 100 can include one or more controllers or processors 110 (e.g., signal processor, microprocessor, ASIC, field programmable gate array (FPGA) or other control and processing logic circuitry) for performing such tasks as signal coding, data processing, input/output processing, power control, and/or other functions. In described embodiments, the illustrated mobile device 100 includes multiple controllers or processors. An operating system 112 can control the allocation and usage of the components 102 in various ways, such as by managing transitions between device states (e.g., transitions between high-power states and low-power states), and can provide support for one or more application programs 114. The application programs can include common mobile computing applications (e.g., location-based applications, image-capture applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as smart cards. The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined into a single input/output device.

A wireless modem 160 can be coupled to an antenna (not shown) and can support two-way communications between the processor(s) 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device 100 can further include at least one input/output port 180, a power supply 182, a satellite navigation system receiver 184 such as a Global Positioning System (GPS) receiver, sensors 186 such as an accelerometer, a gyroscope, or an infrared proximity sensor for detecting the orientation and motion of the device, and for receiving gesture commands as input, a transceiver (188) (for wirelessly transmitting analog or digital signals) and/or a physical connector 190, which can be a USB port, IEEE 1394 (FireWire) port, and/or RS-232 port. The illustrated components 102 are not required or all-inclusive, as any components can be deleted and other components can be added.

The mobile device 100 can determine position data that indicates the position of the mobile device based upon information received through the GPS receiver 184. Alternatively, the mobile device 100 can determine position data that indicates position of the mobile device in another way. For example, the position of the mobile device can be determined by triangulation between cell towers of a cellular network. Or, the position of the mobile device can be determined based upon the known locations of Wi-Fi routers in the vicinity of the mobile device. The position data can be updated every second or on some other basis, depending on implementation and/or user settings. Regardless of the source of position data, the mobile device 100 can provide the position data to an application, such as a location-based application. For example, a map navigation tool periodically requests, or polls for, current position data through an interface exposed by the operating system 112 (which in turn may get updated position data from another component of the mobile device), or the operating system 112 pushes updated position data through a callback mechanism to any application (such as the map navigation tool) that has registered for such updates.

A user of the mobile device can be given notice of the collection of position data (e.g., via an alert provided by an application) and the opportunity to provide or deny consent to collection of position data. Consent can be given in the form of opt-out consent, in which the user can take an affirmative action to prevent collection of position data before it is collected, or opt-in consent, in which the user can take an affirmative action to give consent to collection of position data before the data is collected.

II. Exemplary Device States

Exemplary devices described herein can receive input, perform operations on data, and provide functionality to users while in several different states (e.g., locked or unlocked, high-power or low-power) or combinations of states. For example, a mobile device in a high-power (or active) state typically has a display powered on and other input/output devices available for use. A mobile device in a high-power state typically has an application processor that is running in a high-power state and handling functionality such as operating system functionality. In a low-power (or idle) state, the display is typically dimmed or powered off, and other components (e.g., hardware buttons, keypads, trackballs) can be deactivated, as well. A mobile device in a low-power state typically will put its application processor in a low-power state to conserve battery life, with safeguards to prevent data loss or service disruption. Other processors (e.g., low-power processor) may continue to operate normally or with reduced functionality while the mobile device is in a low-power state.

As another example, in a locked state, a mobile device can restrict access to functionality of the device while exhibiting behaviors such as displaying a lock screen (e.g., a screen that prompts a user for authentication information, such as a PIN or biometric data, to unlock the device), or displaying a blank screen or wallpaper. A locked mobile device may be in a locked/high-power state (e.g., with the display powered on and showing an authentication screen) or a locked/low-power state in which certain features of the mobile device are powered down (e.g., to reduce power consumption relative to a high-power state).

Different events can cause transitions between states. For example, a device can transition from a low-power state to a high-power state in response to user action or independent of user action. A device can transition from a low-power state to a high-power state in response to, for example, a user-activated hardware event such as a button-press or some other hardware event, or in response to a wake-up request from a processor (e.g., a low-power processor) or a software component handled by a processor (e.g., a thread on an application processor wakes up after a scheduled sleep period). As another example, a device in a locked state can transition to an unlocked state in response to a user action (e.g., entering a PIN at a lock screen). As another example, a device in an unlocked state can transition to a locked state (or a device in a high-power state can transition to a low-power state) in response to a user action (e.g., a button-press of a power button) or after a certain amount of time has passed since the last user action (e.g., to conserve battery life).

Alternatively, other states or transitions between states can be used, or other events can cause transitions between states.

III. Exemplary Low-Power State and High-Power State Components

Figure 2:
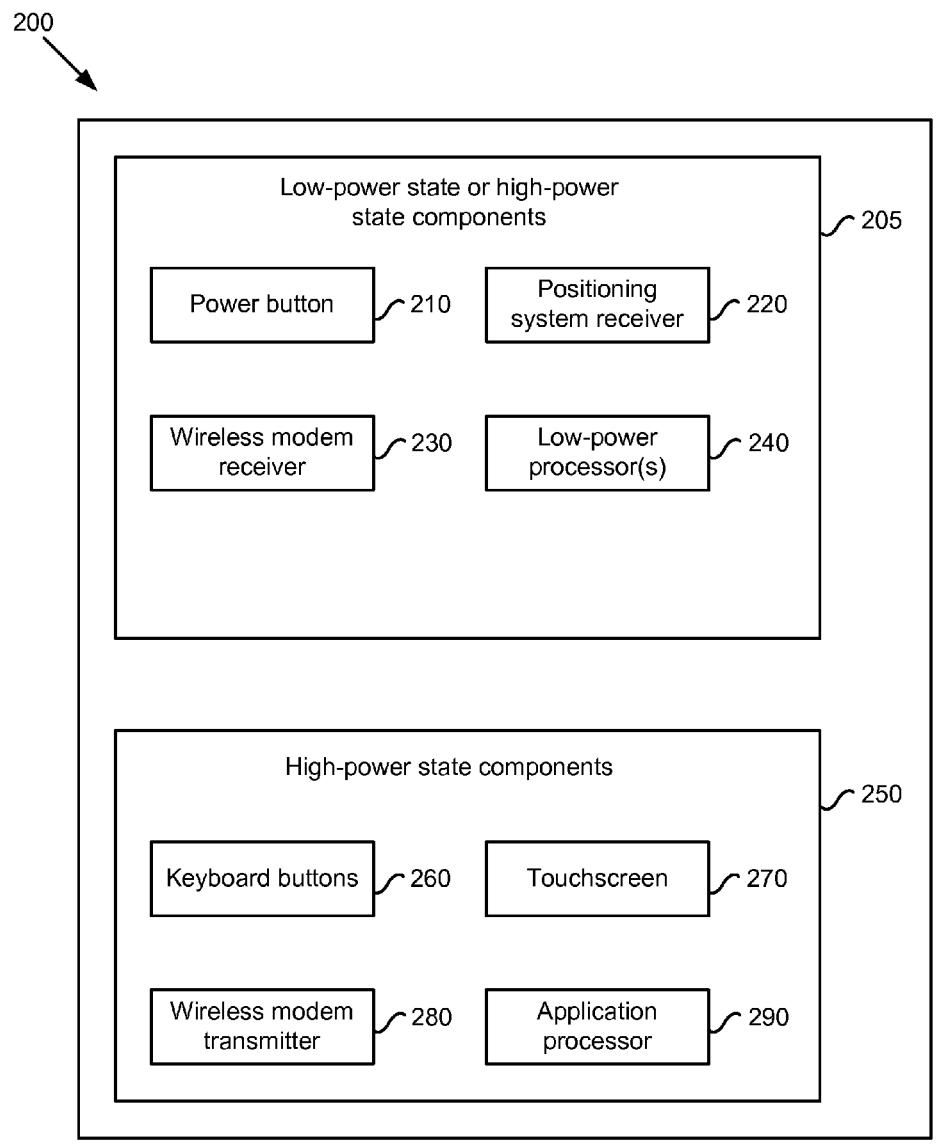
FIG. 2 is a block diagram showing example low-power state components and active-state components of a mobile device.

FIG. 2 is a block diagram showing example components of a mobile device 200 that can be used in a low-power state and/or in a high-power state. In the example shown in FIG. 2, low-power/high-power state components 205 including power button 210, positioning system receiver 220 (e.g., a GPS receiver), wireless modem receiver 230, and one or more low-power processors 240 are functional when the mobile device 200 is in a low-power state or a high-power state. A low-power processor 240 can be implemented as, for example, a GPS processor, a modem processor, or some other low-power processor that performs position tracking operations. High-power state components 250 (e.g., keyboard buttons 260, touchscreen 270, wireless modem transmitter 280, application processor 290) are active when the mobile device 200 is in a high-power state, but are not active when the mobile device is in a low-power state. Thus, only a subset of components is active when the device is in a low-power state, although the high-power state components 250 can remain capable of becoming active when the device is in a low-power state. For example, in a low-power state, the application processor 290 can become active in response to a user action or a wake-up request from the low-power processor 240. In the example shown in FIG. 2, keeping the positioning system receiver 220 and the low-power processor 240 functional in a low-power state allows the mobile device 200 to continue to receive positioning information (e.g., GPS satellite information), and calculate and store position fixes while in a low-power state, as explained in further detail below. The low-power/high-power state components 205 need not be active at all times that the device is powered on, however. For example, if the device 200 is not receiving position information (e.g., in response to a user setting), the positioning system receiver 220 and/or low-power processor 240 can remain inactive.

Alternatively, additional components can be designated as low-power state components. For example, a mobile device can have more than one low-power processor (e.g., GPS processors, modem processors, low-power sensor processors) that can perform position tracking operations individually or cooperatively. A mobile device that includes multiple low-power processors can run in a low-power mode while performing position tracking operations. As another alternative, additional components can be designated as high-power state components. As another alternative, components designated as low-power state components can be designated as high-power state components, or vice versa. As another alternative, one or more of the components shown in FIG. 2 can be deleted and other components can be added.

IV. Architectures for Efficient Power Usage in Position Tracking

Architectures for efficient power usage by devices that perform position tracking operations are described. In described examples, the problem of collecting and using position information is divided into sub-problems that can be solved at an application processor/operating system level of operation and sub-problems that can be solved at a low-power processor (e.g., GPS processor) level of operation. In described examples, these two levels of operation have different power usage characteristics (e.g., due to the use of processors with different power draws) and different operating capabilities. Work can be divided between levels of operation to leverage the strength of the different levels (e.g., by using different processors to accomplish different tasks to tradeoff power consumption versus processing flexibility and responsiveness).

A low-power processor may have limited resources in terms of computational power, memory, or storage space relative to an application processor (e.g., 25% of the storage space available in an application processor, or some other reduced amount relative to the application processor), but many low-power processors still have sufficient resources to handle position tracking operations and store multiple position fixes. For example, position fixes can be calculated and stored in a multiple-entry position information buffer (e.g., in on-chip storage or memory) by a GPS engine running on a low-power processor (e.g., a GPS processor, a modem processor). As an example, the buffer could store any number of entries up to a maximum number (e.g., 1000 entries or some other maximum), with the individual entries having a fixed size (e.g., 100 bytes per entry or some other fixed size) or variable sizes. The exact number of entries that can be stored in such a buffer can vary based on, for example, available storage capacity and the size of the individual entries. The size of the entries can vary based on, for example, the amount of information stored and whether such information is compressed or uncompressed. At a later time (e.g., when the buffer reaches a predetermined fullness level, or when position information is requested by an application), control passes to the application processor, the buffer is flushed and a new set of entries can be added to the buffer.

Figure 3:
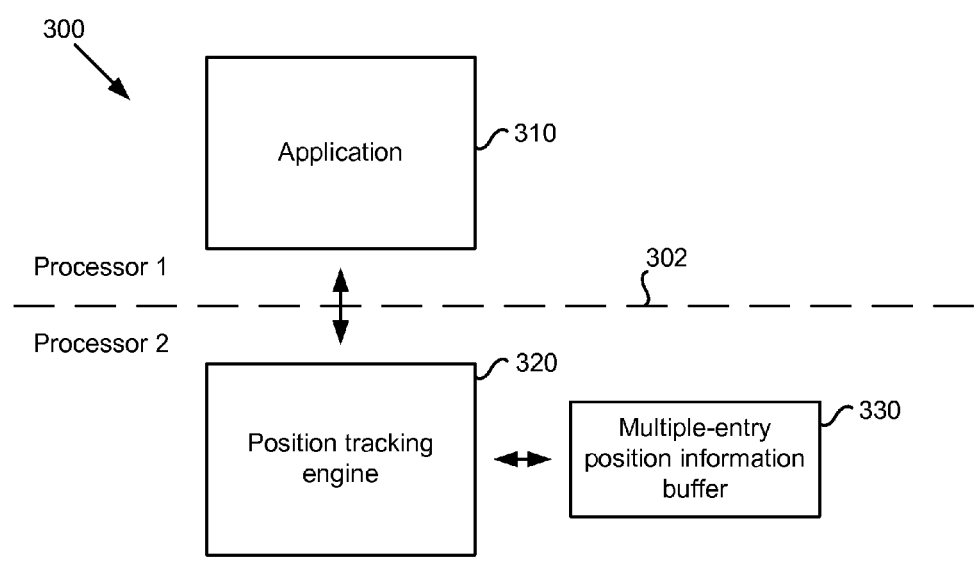
FIG. 3 is a block diagram depicting a generalized architecture for efficient power usage in a device running an application that uses position information, according to at least some technologies described herein.

FIG. 3 is a block diagram showing a generalized architecture 300 for efficient power usage in a device running an application 310 (e.g., a location-based application such as a map navigation application or a tracking application) that uses position information. A computing device (e.g., a mobile device) having multiple processors can be implemented according to the architecture 300. The architecture 300 can be used, for example, to reduce power usage by dividing tasks between processors, and using a low-power processor to calculate and buffer position information.

In the example shown in FIG. 3, the dashed line 302 indicates separation between operations performed by either of two processors, respectively. "Processor 1" executes the application 310, and "Processor 2" implements the position tracking engine 320 (e.g., a GPS engine with firmware, other software adapted to Processor 2 and/or special-purpose hardware), which performs position calculations. For example, the position tracking engine 320 calculates position fixes based on GPS data received from one or more GPS satellites (not shown) via a GPS receiver (not shown). Results of the position calculations are stored in multiple-entry position information buffer 330, which allows multiple position information entries (e.g., GPS position fix entries) to be stored in the buffer. The buffer 330 can be part of the same chipset as Processor 2, separate memory accessible only to Processor 2 or separate memory that is also accessible to other processors in the device, but the buffer 330 is in general "associated with" Processor 2. If a mobile device is in a low-power state, multiple position fixes can be calculated by a low-power processor (Processor 2) while one or more other processors (e.g., Processor 1) remain idle. The contents of the buffer 330 can be transferred (e.g., in a buffer-flushing operation) to be used by the application 310. For example, the contents of the buffer 330 can be transferred when requested by the application 310, when the buffer reaches a particular fullness level, or at some other time.

Figure 4:
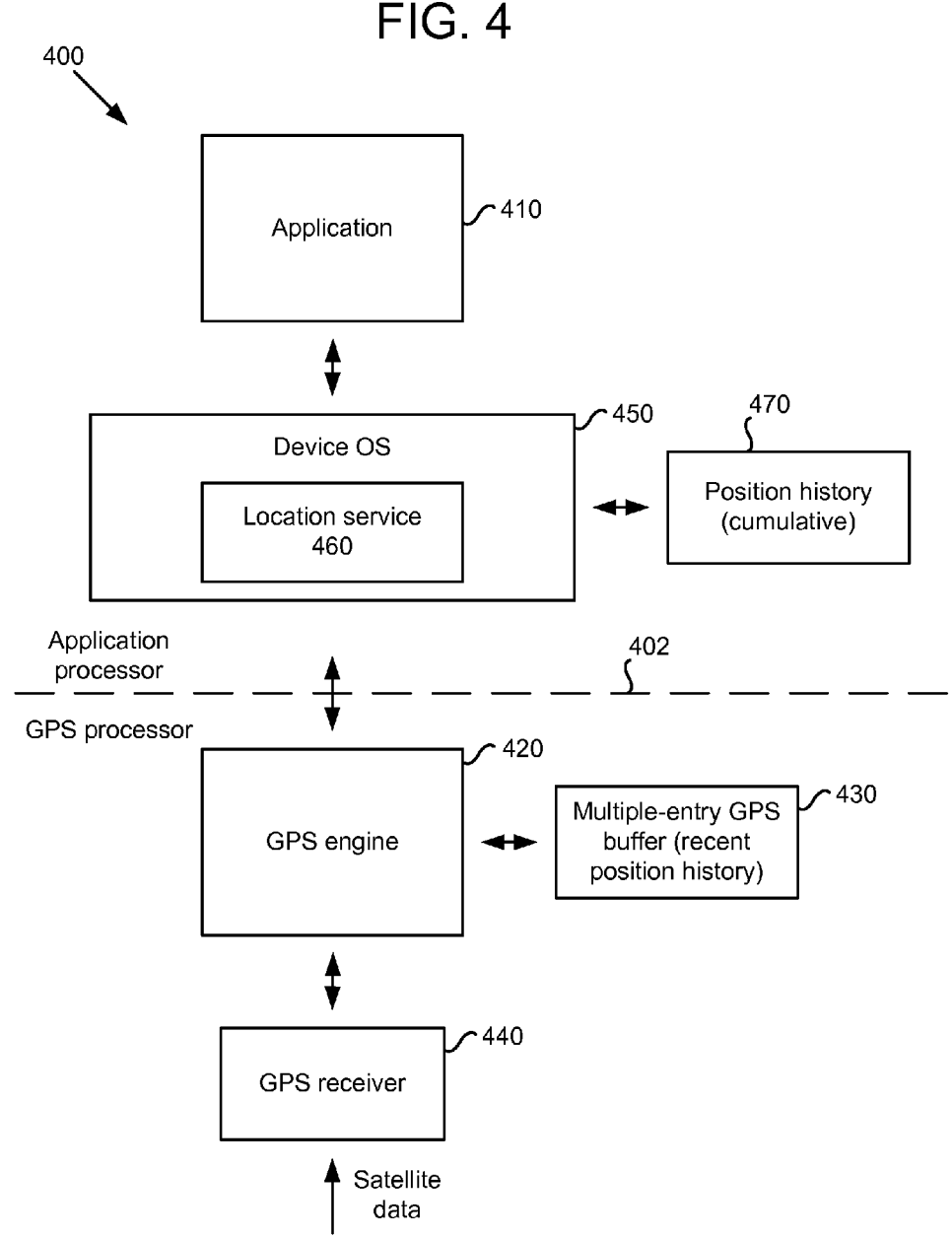
FIG. 4 is a block diagram depicting an exemplary architecture for efficient power usage in a device running an application that uses position information, according to at least some technologies described herein.

FIG. 4 is a block diagram showing an exemplary architecture 400 for efficient power usage in a device running an application 410 that uses position information. A computing device (e.g., a mobile device) having multiple processors can be implemented according to the architecture 400. The architecture 400 can be used, for example, to reduce power usage by using a low-power, GPS processor to calculate and buffer GPS position fixes.

In the example shown in FIG. 4, the dashed line 402 indicates separation between operations performed by an application processor or a GPS processor, respectively. For example, the application processor executes code corresponding to components including the application 410 and the device OS 450, which includes a location service 460 (which can also be referred to as a location engine). Other services and features of the device OS 450 are not shown for the sake presentation. The GPS processor executes code (e.g., firmware and/or other software adapted to the GPS processor) or otherwise provides functionality corresponding to components including GPS engine 420, which performs position calculations. For example, the GPS engine 420 performs calculations to determine GPS position fixes based on GPS satellite data received from one or more GPS satellites (not shown) via GPS receiver 440. Results of the position calculations are stored in multiple-entry GPS buffer 430, which allows multiple position fixes to be stored as entries in the buffer. The buffer 430 can be part of the same chipset as the GPS processor, separate memory accessible only to the GPS processor or separate memory that is also accessible to other processors in the device, but the buffer 430 is in general "associated with" the GPS processor. If a mobile device is in a low-power state, multiple position fixes can be calculated and stored by the GPS processor while the application processor remains idle.

Position information can be transferred after several position fixes have been stored in the buffer 430. This can allow a device to operate in a low-power mode more of the time, and operate in a high-power mode in shorter durations. For example, when the GPS engine 420 has stored enough position fix entries in the buffer 430 such that the buffer has reached a particular fullness level, the GPS engine can wake up the location service 460 on the application processor and send an archived position information vector comprising multiple position fix entries from the buffer, in order to free up storage for new position information at the GPS processor. As another example, the contents of the buffer 430 can be transferred when requested by the location service 460, independent of buffer fullness. The location service 460 can make such requests on behalf of the application 410 periodically or on an on-demand basis. For example, the location service 460 can translate a request for position information made by the application 410 into a request for GPS-specific information. Position information received from the buffer 430 can be stored in position history 470 (e.g., in memory or storage accessible by the application processor), which can be used to buffer larger amounts of position information than the buffer 430 in some implementations. For example, the position history 470 can store entries from several transfers of the contents of the buffer 430. Thus, the contents of the buffer 430 can be transferred on request (e.g., when needed by the location service 460), when the buffer 430 reaches a particular fullness level, or at some other time. The contents of the buffer 430 represent recent position history for the device, while the contents of the position history 470 represent a more cumulative position history for the device.

The location service 460 can handle multiple requests (e.g., simultaneous requests) arising from different client applications. The overall ability of the device to reduce power drain and conserve battery life can depend whether other applications need real-time position information from the GPS engine 420. For example, the location service 460 can handle multiple requests from non-real-time applications by batching or aggregating the requests, and conveying a single request to the GPS engine 420.

Alternatives to the example architectures 300, 400 shown in FIG. 3 and FIG. 4 also can be used. For example, the architectures 300, 400 can include more or fewer modules. A given module can be split into multiple modules, or different modules can be combined into a single module. For example, GPS engine 420 can be split into multiple modules that control different aspects of GPS operations. Functionality described with reference to one module (e.g., location service functionality in device OS 450) can in some cases be implemented as part of another module (e.g., an application). As another example, the architectures 300, 400 can be modified to perform operations on more processors having different levels of power consumption. For example, in addition to an application processor and a GPS processor, a modem processor or low-power sensor processors can be used to perform operations described herein, or other operations.

V. Detailed Example

This section describes a detailed example that uses the architecture 400 shown in FIG. 4 to allow efficient power usage by a device running a location-based application that uses position information obtained from a GPS engine. This detailed example includes a description of an exemplary location service and an application programming interface (API) provided by the exemplary location service. Details described in this section can vary depending on implementation.

In this detailed example, the application 410 interacts with the location service 460 through a set of interfaces. Functionality of the location service can be adjusted based on "quality of service" settings (e.g., how frequently the application 410 can receive updated position information). The location service 460 also can retrieve information about the application 410 (e.g., to determine constraints on the quality of service). For example, the device OS 450 may impose additional restrictions on quality of service for an application running in the background (e.g., by reducing the frequency of available updates to position information), and the location service 460 can retrieve information that indicates this constraint from the device OS 450.

In an exemplary arrangement, a mobile computing device comprises an application processor operable to switch between one or more low-power states and one or more high-power states, a low-power processor (e.g., a GPS processor), and storage media. A first storage medium includes computer-executable code corresponding to a first interface between a location-based application and a location service.

The first interface supports specification by the location-based application of one or more conditions (e.g., time between notifications, distance between notifications) under which position information is buffered between notifications. The low-power processor provides a second interface. The second interface supports specification by the location service of one or more conditions (e.g., threshold distance between positions to be stored, distance between notifications) under which a position tracking engine buffers position information between notifications in position entries of a second storage medium, according to one or more conditions specified by the location service. The second interface also can support periodic receipt (e.g., receipt by specified time period) and/or on-demand receipt (e.g., in response to user action or application request) of requests by the location service for the position tracking engine to provide a notification with buffered position information.

A description of an exemplary API provided by the location service 460 is provided with pseudocode in Table 1, below:

As shown in Table 1, the RegisterForPositionHistory method is used for starting a position tracking session with the location service 460. In the position tracking session, a new position will be captured if the device moves by the distance provided in the dblMovementThreshold parameter. A callback function (represented by the parameter funcReceivePositions) implemented by the application 410 will be called back by the location service 460 when a notification is available based on the dblDistanceBetweenNotification and dwSecondsBetweenNotification parameters. For example, position information (e.g., from the position history 470 or the multiple-entry GPS buffer 430) is provided if the device moves by the distance represented by the dblDistanceBetweenNotification parameter. As another example, position information is provided if the time since the last notification has elapsed by the amount represented by the dwSecondsBetweenNotification parameter. The location service 460 can override the values of the dblDistanceBetweenNotification and dwSecondsBetweenNotification parameters depending on the state or characteristics of the application 410 (e.g., by substituting a new value representing a lower quality of ser-

TABLE 1

Exemplary location service API features.

| API Feature | Description |
|---|---|
| typedef struct {<br>    DOUBLE    dblLatitude ;<br>    DOUBLE    dblLongitude ;<br>    DOUBLE    dblAltitude ;<br>    DOUBLE    dblDirection ;<br>    DOUBLE    dblVelocity ;<br>    TIME    tsTimestamp ;<br>} POSITION ; | A data structure comprising position information and timestamp information. |
| typedef vector <POSITION> POSITION_HISTORY ; | A data structure comprising a collection of POSITION data structures. |
| typedef HANDLE    TRACKINGSESSION_COOKIE ; | A data structure that refers to a position tracking session cookie. |
| delegate HRESULT PositionHistoryCallback (<br>    POSITION_HISTORY phPositions ) ; | A position history callback function. |
| TRACKINGSESSION_COOKIE RegisterForPositionHistory (<br>    DOUBLE    dblMovementThreshold ;<br>    PositionHistoryCallback    funcReceivePositions ;<br>    DOUBLE    dblDistanceBetweenNotification = INFINITE ;<br>    DWORD    dwSecondsBetweenNotification = INFINITE ; ) ; | A method used for starting a position tracking session. |
| HRESULT UnregisterPositionHistory (<br>    TRACKINGSESSION_COOKIE pcTrack ) ; | A method used for stopping a position tracking session. |
| void RetrievePositionHistory ( ) | A method used for forcing the location service to return out-of-band position information. |

As shown in Table 1, the POSITION data structure comprises position information and timestamp information. An instance of the POSITION data structure represents an individual entry from the multiple-entry GPS buffer 430. The POSITION_HISTORY data structure comprises a collection of POSITION data structures. An instance of the POSITION_HISTORY data structure represents an archived position information vector from the multiple-entry GPS buffer 430. Multiple instances of the POSITION_HISTORY data structure can be aggregated into a single, combined instance of the POSITION_HISTORY data structure. In other words, the POSITION_HISTORY data structure represents a collection of POSITION data structure entries.

vice if the application is running in the background). A value of INFINITE (the default value for the dblDistanceBetweenNotification and dwSecondsBetweenNotification parameters) indicates that the application 410 has no specific requested settings for when to receive position information.

As shown in Table 1, the UnregisterPositionHistory method is used for stopping the position tracking session with the location service 460. The RetrievePositionHistory method is used for forcing the location service to return out-of-band position information. For example, an application can use the RetrievePositionHistory method to retrieve intermediate position information from the multiple-entry GPS buffer 430, without waiting for the location service 460 to call back the application. The location service 460 can decide to ignore this call depending on the state of application 410. For example, the location service 460 can ignore this call if the application 410 is running in the background and a low quality of service has been designated. The application 410 can use the RetrievePositionHistory method, for example, when it is in an interactive mode with a user at the end of a tracking session.

In an exemplary scenario, when the application 410 requests a new position tracking session with the location service 460, the service creates an identifier for the position tracking session, records all parameters of the position tracking session under the identifier, and associates a cookie with the identifier. The location service 460 in turn passes on at least some of the tracking parameters to the GPS engine 420, registers for a callback with the GPS engine, sets a wakeup timer (if any) based on the dwSecondsBetweenNotification value, and goes to a waiting state. The location service 460 may receive multiple position tracking session requests from different applications, in which case the location service 460 may batch requests to reduce the number of times the location services 460 is awoken from the low-power, waiting state to receive updated position information.

Note that once the application 410 registers a new position tracking session, it subsequently goes to a waiting state until it receives a callback from the location service 460. A foreground application can force the callback (e.g., using the RetrievePositionHistory method described above); however, this can reduce power savings of the described API semantics.

When the GPS engine 420 starts tracking position information, as the device moves beyond the distance represented by the dblMovementThreshold parameter, it records the position information in the multiple-entry GPS buffer 430. When the buffer 430 gets near capacity (e.g., 75% of buffer capacity, or any other suitable percentage of buffer capacity), the GPS engine 420 sends a notification and provides the archived position information vector, for example, raising an event to the location service 460 to instruct the location service to retrieve the archived position information vector from the buffer 430 on the GPS processor side and store it in the position history 470 on the application processor side. This allows the GPS engine 420 to flush the buffer 430 and record new position information without losing any position information. The GPS engine 420 may use a dynamic size buffer (e.g., with a capacity that depends on the device's current velocity, location, or some other factor). For example, a device moving at a higher velocity may benefit from collecting more position information, and a larger buffer can hold more position information.

With both the application 410 and the location service 460 in a waiting state, the device OS 450 can transition the application processor to a low-power mode (e.g., where no other applications or services require the device to be in a high-power mode). In this detailed example, the application processor can wake up (transition to a high-power mode) on one of the following conditions:

1. The user initiates an action on the mobile device that requires the application processor to wake up.

2. The dwSecondsBetweenNotification interval has passed and the location service 460 is due to wake up (exit the waiting state).

3. The GPS engine 420 triggers (e.g., based on a buffer fullness level, or when distance exceeds dblDistanceBetweenNotification) the location service 460 to wake up and fetch the contents of the multiple-entry GPS buffer 430.

In an exemplary scenario, the location service 460 can be implemented for a single tracking session as shown in pseudocode in Table 2, below:

TABLE 2

Pseudocode for implementing a location service.

| Pseudocode | Description |
|---|---|
| typedef struct _TRACKING_SESSION {<br>    PositionHistoryCallback m_funcApplicationCallback ;<br>    DOUBLE    m_dblDistanceBetweenNotification ;<br>    DWORD    m_dwSecondsBetweenNotification ;<br>    POSITION    m_posLastNotificationPosition ;<br>    TIME    m_tsLastNotificationTime ;<br>    POSITION_HISTORY m_phPositions ;<br>} *POSITION_COOKIE ; | A data structure that includes position and timestamp information of last notification to the application. |
| POSITION_COOKIE m_pcTrack ;<br>POSITION_COOKIE RegisterForPositionHistory (<br>    DOUBLE    dblMovementThreshold,<br>    PositionHistoryCallback    funcReceivePositions,<br>    DOUBLE    dblDistanceBetweenNotification,<br>    DWORD    dwSecondsBetweenNotification )<br>{    m_pcTrack = new _TRACKING_SESSION ; | Start a position tracking session and create a tracking session data structure for this session. |
|     pcTrack->m_posLastNotificationPosition = GetCurrentPosition ( ) ;<br>    pcTrack->m_tsLastNotificationTime = GetCurrentTime( ) ;<br>    pcTrack->m_funcApplicationCallback = funcApplicationCallback ;<br>    pcTrack->m_dblDistanceBetweenNotification = dblDistanceBetweenNotification ;<br>    pcTrack->m_dwSecondsBetweenNotification = dwSecondsBetweenNotification ; | Fill a tracking session data structure with application-supplied parameters. |
|     if ( pcTrack->m_dwSecondsBetweenNotification != INFINITE )<br>    {<br>        SetTimerEvent (pcTrack->m_dwSecondsBetweenNotification, NotificationHandler) ;<br>    } | Arm a timer to wake up the location service. |

TABLE 2-continued

Pseudocode for implementing a location service.

| Pseudocode | Description |
|---|---|
| RegisterForGpsNotification ( dblMovementThreshold, NotificationHandler, dblDistanceBetweenNotification ) ; return m_pcTrack ; } | Pass tracking parameters to the GPS engine, and return. |
| void NotificationHandler ( ) { | Raise an event to indicate position information to be retrieved from the GPS buffer. |
| POSITION_HISTORY phNewGpsPositions = FlushGpsBuffer ( ) ; m_pcTrack->phPositions.Append (phNewGpsPositions); | Flush the GPS buffer and get newer positions into the cumulative position history, appending the new positions to the vector of positions. |
| if ( ! m_pcTrack->phPositions.IsEmpty( ) ) { pcTrack->m_funcApplicationCallback ( pcTrack->m_phPositions ) ; | Send a notification to the application if there are new positions to report. |
| pcTrack->m_posLastNotificationPosition = GetCurrentPosition ( ) ; pcTrack->m_tsLastNotificationTime = GetCurrentTime( ) ; | Set the current time and position as the "Last Notification" points. |
| m_pcTrack->phPositions.Empty( ) ; if ( pcTrack->m_dwSecondsBetweenNotification != INFINITE ) { ResetTimerEvent (pcTrack->m_dwSecondsBetweenNotification, NotificationHandler) ; } return ; } | Empty the position vector. Re-arm the timer to wake up, and return. |
| void RetrievePositionHistory ( ) { return NotificationHandler ( ) ; } | Retrieve position history. |

Based on the movement threshold, the GPS engine can add a position to a position entry in the GPS buffer 430. When the local buffer reaches capacity (or a buffer fullness level that is near capacity), or when the most recent position exceeds the dblDistanceBetweenNotification value, the GPS engine can raise an event to the location service 460.

VI. Exemplary Location-Based Applications

As used herein, the term "location-based application" refers to an application that uses position information (e.g., GPS position fixes). For example, a location-based application running on a mobile device can provide information to the user based on the location of the device (e.g., displaying a nearby restaurant and/or displaying the user's location on a map). The exact type of position information used can depend on factors such as the requirements of a particular mobile computing platform or location-based application and/or the functionality of a particular device on which a location-based application is running. Some examples of location-based applications are applications that can be used by individuals to collect information (e.g., speed, direction, length of time spent in different locations) that describes their own movements (e.g., for informative purposes, such as while traveling in an unfamiliar city, or to chart progress while jogging or participating in some other exercise regimen) and/or movements of others (e.g., parents monitoring a child, teammates monitoring each other's location in a location-based game). Another example is a tracking application that can be used in a crowdsourcing scenario to collect information from a large number of devices (e.g., to build map databases).

Some location-based applications (such as the tracking applications described above) do not need real-time position information to function, and may instead use position information that is collected at regular or irregular intervals, or on an as-needed basis. Power consumption in devices that run such applications can be reduced by employing technologies described herein.

Figure 5:
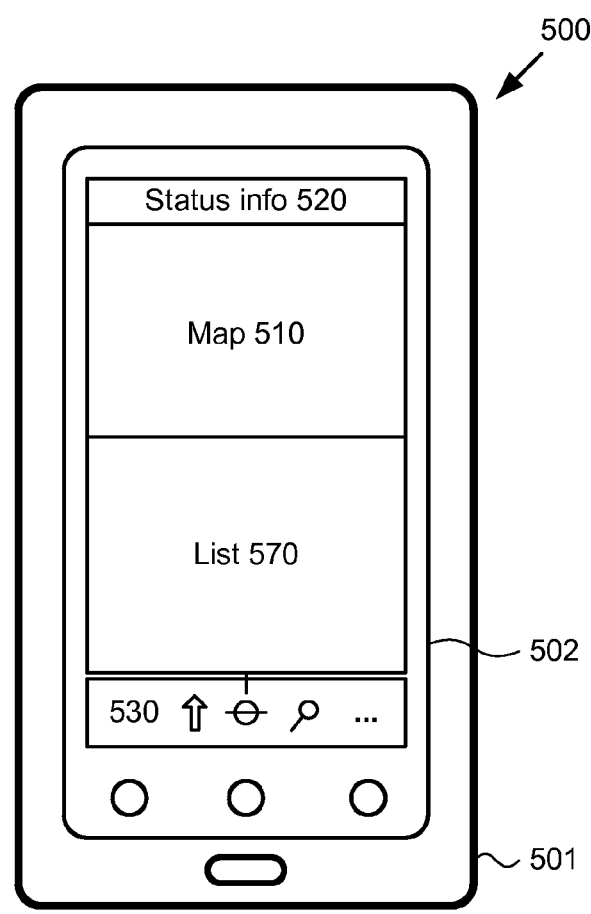
FIG. 5 is a diagram illustrating features of a generalized view rendered on a display of a mobile device using a location-based application.

FIG. 5 illustrates a generalized view 500 rendered using a location-based application of a mobile computing device 501. In an exemplary scenario, the location-based application can render a representation (e.g., a highlighted path or location markers on a map, a list of locations) of position information (e.g., GPS position fixes) that was calculated by a low-power processor (e.g., a GPS processor) and stored in a multiple-entry buffer while the device 501 was in a low-power state. The view 500 may be rendered when the device 501 in a high-power state.

The device 501 includes one or more device buttons. FIG. 5 shows a single device button near the bottom of the device 501. The effect of actuating the device button depends on context. For example, actuation of the device button can cause the device 501 to return to a home screen or start screen from the location-based application. Alternatively, the device 501 includes no device buttons.

The device 501 includes a touchscreen 502 with a display area and three touchscreen buttons (e.g., a search button, a navigation button such as a back button). The effect of actuating one of the touchscreen buttons depends on context and which button is actuated. Alternatively, the device includes more touchscreen buttons, fewer touchscreen buttons or no touchscreen buttons. The functionality implemented with a physical device button can be implemented instead with a touchscreen button, or vice versa.

In the display area of the touchscreen 502, the device 501 renders views. In the example shown in FIG. 5, as part of the view 500, the device 501 renders a map 510 and status information 520. The map 510 can include, for example, a highlighted path or location markers based on position information (e.g., GPS position fixes) calculated by a low-power processor (e.g., a GPS processor) and stored in a multiple-entry buffer while the device 501 was in a low-power state. The status information 520 can include time, date, network connection status and/or other information. In the example shown in FIG. 5, the device 501 also renders a control section 530 that includes map navigation buttons, which depend on implementation of the location-based application. FIG. 5 shows an arrow icon, a crosshairs icon, and a magnifying glass icon. Actuation of the arrow icon can cause the device 501 to open a menu for keystroke input for a destination location and directions to the location. Actuation of the crosshairs icon can cause the device 501 to align the view position over the current location of the device 501. Actuation of the magnifying glass icon can cause the device 501 to open a menu for keystroke input for a search for a location or locations. Other buttons/controls can be accessed by actuating the ellipses. In the example shown in FIG. 5, the device 501 also renders a list 570 that can show details of position fixes and/or other information. The list 570 also can operate as a control to cause the device 501 to align the view position over a previous location of the device (e.g., a GPS position fix calculated by a low-power processor and stored in a multiple-entry buffer while the device was in a low-power state). Alternatively, the device renders more controls, fewer controls, or no controls.

VII. Exemplary Techniques

Figure 6:
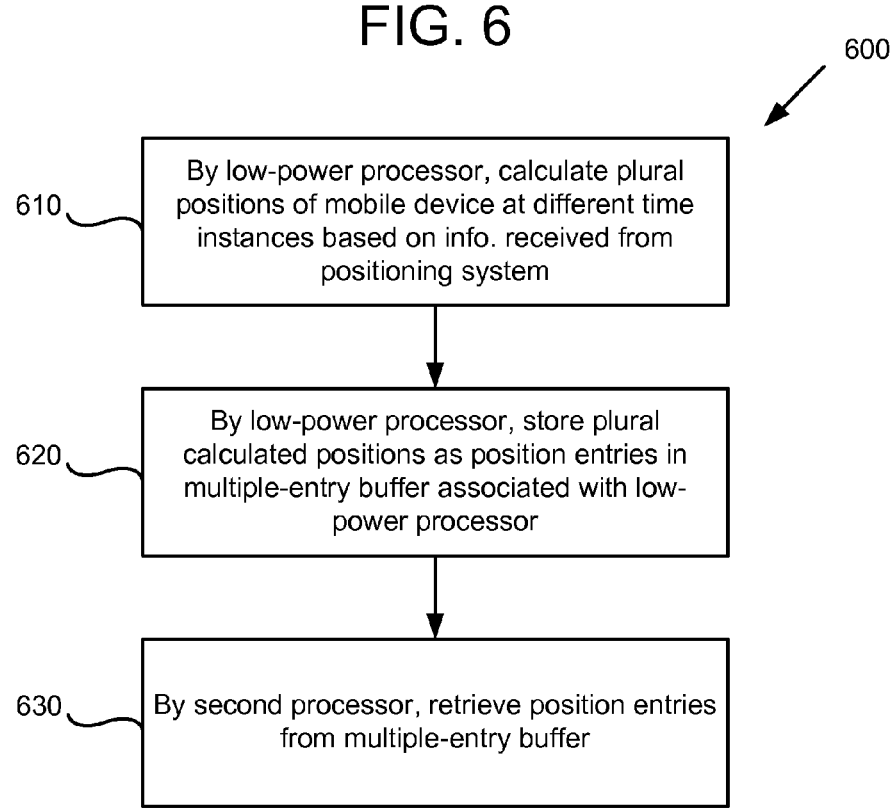
FIG. 6 is a flowchart showing a generalized technique for operations of a low-power processor and another processor for efficient power usage in a device that uses position information.

FIG. 6 is a flowchart showing an exemplary technique 600 in which position tasks are divided between a low-power processor (e.g., a GPS processor) and another processor (e.g., an application processor). A mobile device such as a smart phone or other mobile device performs the technique 600.

At 610, a low-power processor (e.g., a GPS processor, a modem processor, or some other low-power processor) of the mobile device calculates plural positions of the mobile device at different time instances based on information received from a positioning system (e.g., GPS). At 620, the low-power processor stores plural calculated positions as position entries in a multiple-entry buffer associated with the low-power processor. At 630, a second processor (e.g., an application processor) of the mobile device retrieves position entries from the multiple-entry buffer. For example, an application processor in a high-power state retrieves the position entries in response to a request for position information from a location service executed by the application processor. The request may be made on behalf of an application (e.g., a location-based application also executed by the application processor). Or, a position tracking engine (e.g., a GPS engine) executing on or otherwise implemented by the low-power processor can determine whether the multiple-entry buffer has reached a fullness level, and send a notification to the second processor based on that determination. To conserve battery life, the low-power processor can calculate and store the position entries in the multiple-entry buffer while the second processor is in a low-power state. The second processor can transition from a low-power state to a high-power state prior to retrieving the position entries.

FIG. 7 is a flowchart showing an exemplary technique 700 in which GPS position tasks are divided between a low-power GPS processor and an application processor. A mobile device such as a smart phone or other mobile device performs the technique 700.

At 710, a low-power GPS processor of a mobile device requests satellite position information (e.g., from a set of available GPS satellites). At 720, a GPS receiver of the mobile device receives satellite position information, and at 730 the GPS processor calculates plural position fixes based on the received satellite position information. For example, the received satellite position information can correspond to the positioning of satellites in a GPS constellation at different time instances, and the calculated position fixes can correspond to the location of the mobile device at the different time instances. Various techniques for calculating position fixes based on satellite information are known in the art and need not be described in detail here. At 740, the GPS processor stores the position fixes in a multiple-entry GPS buffer on the GPS processor. At 750, an application processor of the mobile device transitions from a low-power state to a high-power state. At 760, a location service executing on the application processor retrieves the position fixes from the multiple-entry GPS buffer. At 770, a location-based application executing on the application processor causes output of information (e.g., via a graphical user interface rendered on a display of the mobile device) based on the position fixes from the multiple-entry GPS buffer.

FIGS. 8A and 8B are flowcharts showing exemplary techniques 800A, 800B for performing position tasks at a first processor (e.g., a GPS processor) and a second processor (e.g., an application processor), respectively, on a smart phone or other mobile device, where the first processor is a low-power processor relative to the second processor. Spacing in FIGS. 8A and 8B indicates exemplary timing of method steps relative to each other. For example, as shown in FIGS. 8A and 8B, method steps 810A 820A, and 830A occur after method step 810E and before method step 820B.

At 810A, the low-power processor receives condition information (e.g., distance threshold parameters, movement threshold parameters, buffer fullness parameters, or other condition information) that specifies one or more conditions for buffering of positions between notifications. For example, the low-power processor receives the condition information from the second processor (which can have a location-based application and/or location service executing on it). The condition information can be provided by the second processor using any suitable mechanisms.

At 820A, the low-power processor calculates plural positions of a mobile device at different time instances based on information received from a positioning system. For example, a GPS engine is provided by the low-power processor, and the positioning system comprises GPS. At 830A, according to the one or more conditions, the low-power processor stores at least some of the plural positions as position entries in a multiple-entry buffer associated with the low-power processor. For example, the low-power processor stores a given position of the plural positions as one of the position entries if distance between the given position and a previously stored position exceeds a movement threshold. The movement threshold can be set responsive to a movement threshold parameter received from the second processor as part of the one or more conditions. In a GPS scenario, the low-power processor can request satellite position information, which can be received by a GPS receiver. The low-power processor can calculate plural position fixes of the mobile device based on the received satellite position information. The position fixes can be stored as the plural positions in the multiple-entry buffer.

FIG. 8A does not imply any timing requirement with respect to batching of the calculation and storage of positions. The low-power processor can interleave and repeat operations 820A and 830A—calculating and storing a first position, then calculating and storing a second position, and so on.

The low-power processor can provide position information for the position entries from the multiple-entry buffer to the second processor. For example, the low-power processor can provide position information responsive to a request for such information from a location service executing on the second processor when the second processor is in a high-power state. Or, the low-power processor can determine that the multiple-entry buffer has reached a buffer-fullness level, and responsive to that determination, send a notification that provides the position information for the position entries to the second processor. Or, the low-power processor can determine that a distance between two of the positions stored as position entries exceeds a distance threshold, and responsive to that determination, send a notification that provides the position information for the position entries to the second processor. The position information can be provided by the low-power processor using any suitable mechanisms.

At 810B, the second processor provides condition information that specifies one or more conditions for buffering of positions between notifications. The condition information can be provided by the second processor using any suitable mechanisms. At 820B, the second processor receives position information for position entries in a multiple-entry buffer associated with the first processor, the position information indicating one or more positions stored in the multiple-entry buffer according to the one or more conditions. The position information can be received by the second processor using any suitable mechanisms. At 830B, the second processor causes output of information by the mobile computing device based on the position information.

The second processor can transition from a high-power state to a low-power state after providing the condition information, and can transition from the low-power state to the high-power state in order to receive the position information. (The second processor receives the position information while in the high-power state.) The second processor can send a request for the position information to the first processor after transitioning from the low-power state to the high-power state. For example, the request is made on behalf of a location-based application executing on the second processor or an operating system executing on the second processor. The request can be repeated periodically or on demand. Or, the second processor can receive a notification to awaken from the low-power state, and transition from the low-power state to the high-power state responsive to the notification. The notification can be made on behalf of a position tracking engine provided by the low-power processor.

In any of the above techniques, any combination of the operations described herein can be applied. Depending on implementation and the type of processing desired, processing stages shown in example techniques can be rearranged, added, omitted, split into multiple stages, combined with other stages, and/or replaced with like stages. Some operations described as being performed by a low-power processor can be performed by another processor (e.g., an application processor), or vice versa.

VIII. Exemplary Computing Environment

Figure 9:
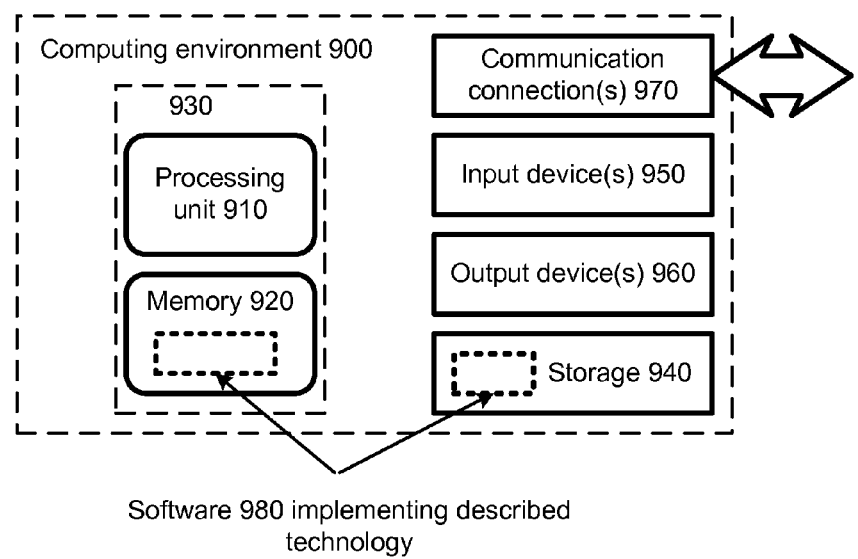
FIG. 9 is a diagram illustrating a generalized example of a suitable computing environment in which at least some of the described technologies can be implemented.

FIG. 9 illustrates a generalized example of a suitable computing environment 900 in which at least some of the described technologies can be implemented. The computing environment 900 is not intended to suggest any limitation as to scope of use or functionality, as the technologies may be implemented in diverse general-purpose or special-purpose computing environments.

With reference to FIG. 9, the computing environment 900 includes at least one processing unit 910 coupled to memory 920. In FIG. 9, this basic configuration 930 is included within a dashed line. The processing unit 910 executes computer-executable instructions. In a multi-processing system, multiple processing units execute computer-executable instructions to increase processing power. The memory 920 may be non-transitory memory, such as volatile memory (e.g., registers, cache, RAM), non-volatile memory (e.g., ROM, EEPROM, PLA, flash memory, etc.), or some combination of the two. The memory 920 can store software 980 implementing technologies described herein.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other non-transitory computer-readable media which can be used to store information and which can be accessed within the computing environment 900. The storage 940 can store software 980 containing instructions for technologies described herein.

The input device(s) 950 may be a touch input device such as a keyboard, touchscreen, mouse, pen, or trackball, a voice input device, a scanning device, or another device that provides input to the computing environment 900. The output device(s) 960 may be a display, printer, speaker, CD- or DVD-writer, or another device that provides output from the computing environment 900. Some input/output devices, such as a touchscreen, may include both input and output functionality.

The communication connection(s) 970 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

At least some of the techniques herein can be described in the general context of computer-executable instructions, such as those included in program modules, being executed in a computing environment on a target real or virtual processor (e.g., software executable on a general-purpose processor such as an application processor, or firmware or other software for a special-purpose processor such as a GPS processor). Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

In general, the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

In general, at least some of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

In general, at least some of the methods described herein can be implemented by computer-executable instructions stored in one or more non-transitory computer-readable storage devices (e.g., memory, CD-ROM, CD-RW, DVD, or the like). Such instructions can cause a computer to perform the method.

IX. Exemplary Implementation Environment

Figure 10:
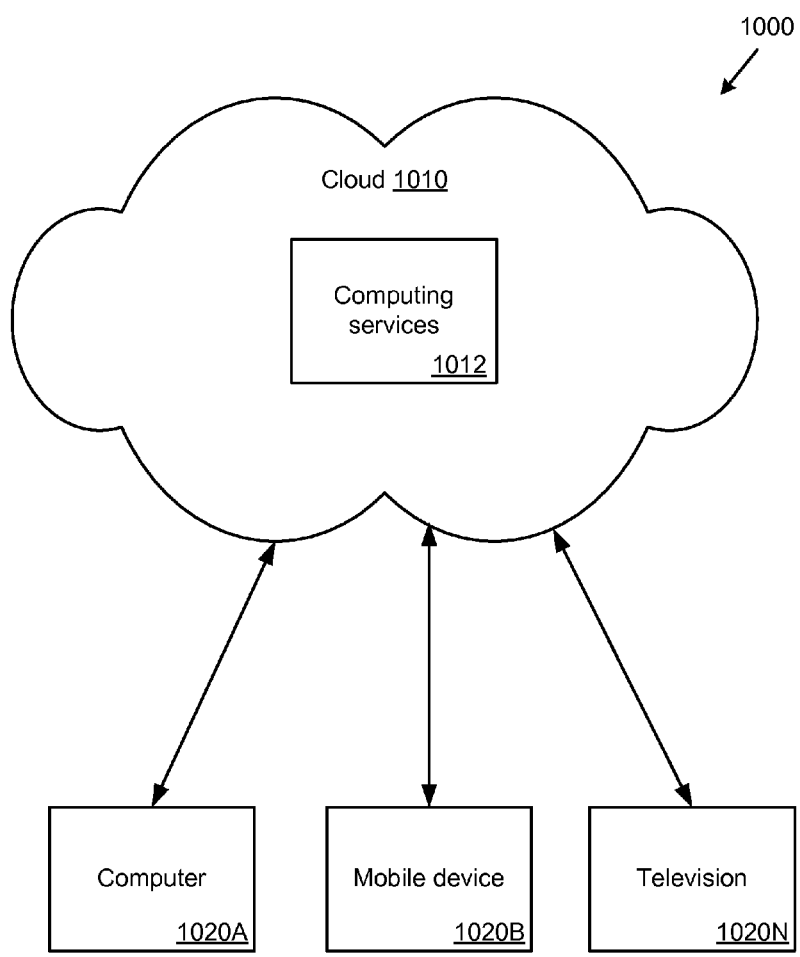
FIG. 10 is a diagram illustrating a generalized example of a suitable implementation environment in which at least some of the described technologies can be implemented.

FIG. 10 illustrates a generalized example of a suitable implementation environment 1000 in which at least some of the described embodiments, techniques, and technologies may be implemented.

In example environment 1000, various types of services (e.g., computing services 1012) are provided by a cloud 1010. For example, the cloud 1010 can comprise a collection of computing devices, which may be located centrally or distributed, that provide cloud-based services to various types of users and devices connected via a network such as the Internet. The cloud computing environment 1000 can be used in different ways to accomplish computing tasks. For example, with reference to the described techniques and tools, some tasks, such as presenting a user interface, can be performed on a local computing device, while other tasks, such as data processing or storage of data to be used in subsequent processing, can be performed elsewhere in the cloud.

In example environment 1000, the cloud 1010 provides services for connected devices with a variety of screen capabilities 1020A-N. Connected device 1020A represents a device with a mid-sized screen. For example, connected device 1020A could be a personal computer such as desktop computer, laptop, notebook, netbook, or the like. Connected device 1020B represents a device with a small-sized screen. For example, connected device 1020B could be a mobile phone, smart phone, personal digital assistant, tablet computer, and the like. Connected device 1020N represents a device with a large screen. For example, connected device 1020N could be a television (e.g., an Internet-enabled television) or another device connected to a television or projector screen (e.g., a set-top box or gaming console).

A variety of services can be provided by the cloud 1010 through one or more service providers (not shown). Cloud services can be customized to the screen size, display capability, or other functionality of the particular connected device (e.g., connected devices 1020A-N). For example, cloud services can be customized for mobile devices by taking into account the screen size, input devices, and communication bandwidth limitations typically associated with mobile devices.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a mobile computing device having first and second processors, the first processor being a low-power processor compared to the second processor, a method comprising, by the first processor:
   receiving condition information that specifies one or more conditions for buffering of positions between notifications;
   calculating plural positions of the mobile computing device at different time instances based on information received from a positioning system;
   according to the one or more conditions, storing at least some of the plural positions as position entries in a multiple-entry buffer associated with the first processor; and
   providing position information for the position entries from the multiple-entry buffer in a notification to the second processor, where the providing is responsive to at least one of:
      determining that the multiple-entry buffer has reached a buffer fullness level;
      receiving a request for position information from a location service executing on the second processor when the second processor is in a high-power state; or
      determining that a distance between two of the positions stored as position entries exceeds a distance threshold.

2. The method of claim 1, wherein the positioning system comprises GPS, and wherein a position tracking engine provided by the first processor comprises a GPS engine.

3. The method of claim 1, wherein the position information is provided responsive to determining that a distance between two of the positions stored as position entries exceeds a distance threshold, and further comprising, by the first processor:
   setting the distance threshold based on a distance threshold parameter received from the second processor as part of the one or more conditions.

4. The method of claim 1 wherein the first processor stores a given position of the plural positions as one of the position entries if a distance between the given position and a previously stored position exceeds a movement threshold.

5. The method of claim 4 further comprising, by the first processor:
   setting the movement threshold based on a movement threshold parameter received from the second processor as part of the one or more conditions.

6. The method of claim 1 further comprising:
   requesting satellite position information; and
   by a GPS receiver of the mobile computing device, receiving satellite position information, wherein the first processor calculates the plural positions of the mobile computing device based on the received satellite position information.

7. A mobile computing device comprising:
   a first processor;
   a second processor, wherein the first processor is a low-power processor compared to the second processor;
   a multiple-entry buffer associated with the first processor; and
   a position tracking engine that configures the first processor to:
      receive condition information that specifies one or more conditions for buffering of positions of the mobile computing device in the multiple-entry buffer between notifications;

calculate plural positions of the mobile computing device at different time instances;

according to the one or more conditions, store at least some of the plural positions as position entries in the multiple-entry buffer; and provide position information for the position entries from the multiple-entry buffer to the second processor responsive to at least one of:

- determining that the multiple-entry buffer has reached a buffer fullness level;
- receiving a request for position information from a location service executing on the second processor when the second processor is in a high-power state; or
- determining that a distance between two of the positions stored as position entries exceeds a distance threshold.

8. The mobile computing device of claim 7, wherein the first processor comprises a GPS processor, and wherein the position tracking engine configures the first processor to calculate the plural positions of the mobile computing device at different time instances using information received via a GPS receiver.

9. The mobile computing device of claim 7, wherein the one or more conditions comprise at least one of a time between notifications, a distance between notifications, or a threshold distance between positions to be stored.

10. At least one non-volatile computer memory storing instructions that, when executed, cause a low-power processor in a mobile computing device to perform position processing comprising:

receiving condition information that specifies one or more conditions for buffering of positions of the mobile computing device between notifications;

calculating plural positions of the mobile computing device at different time instances;

based at least in part on the one or more conditions, storing at least some of the plural positions as position entries in a multiple-entry buffer associated with the first processor; and providing position information for the position entries from the multiple-entry buffer to an other processor in the mobile computing device when at least one of:

- the multiple-entry buffer has reached a buffer fullness level;
- a request for position information is received from a location service executing on the other processor when the other processor is in a high-power state; or
- a distance between two of the positions stored as position entries exceeds a distance threshold.

11. The at least one non-volatile computer memory of claim 10, wherein the position processing further comprises setting a movement threshold based on a movement threshold parameter received as part of the one or more conditions, and wherein, as part of the position processing, the low-power processor stores a given position of the plural positions as one of the position entries if a distance between the given position and a previously stored position exceeds the movement threshold.

* * * * *